United States Patent
Childers

(10) Patent No.: US 9,720,182 B2
(45) Date of Patent: Aug. 1, 2017

(54) FIBER OPTIC FERRULE WITH IMPROVED ABILITY TO ACHIEVE FERRULE MATING PLANE CONTACT

(71) Applicant: US Conec, Ltd., Hickory, NC (US)

(72) Inventor: Darrell R. Childers, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

(21) Appl. No.: 15/137,303

(22) Filed: Apr. 25, 2016

(65) Prior Publication Data

US 2016/0313511 A1 Oct. 27, 2016

Related U.S. Application Data

(60) Provisional application No. 62/151,948, filed on Apr. 23, 2015.

(51) Int. Cl.
 *G02B 6/36* (2006.01)
 *G02B 6/38* (2006.01)

(52) U.S. Cl.
 CPC ......... *G02B 6/3821* (2013.01); *G02B 6/3885* (2013.01)

(58) Field of Classification Search
 None
 See application file for complete search history.

(56) References Cited

U.S. PATENT DOCUMENTS

| 7,077,576 B2 | 7/2006 | Luther et al. |
| 7,540,666 B2 | 6/2009 | Luther et al. |
| 8,821,034 B2 | 9/2014 | Kwasny |

*Primary Examiner* — Mike Stahl
(74) *Attorney, Agent, or Firm* — Michael L. Leetzow, P.A.

(57) ABSTRACT

A fiber optic ferrule includes on a rear surface thereof a pair of spring pads, each of the pair of spring pads having an engagement surface facing away from the fiber optic ferrule to engage a spring to eliminate off-axis moments. A fiber optic connector is also provided that uses the fiber optic ferrule. The engagement surface could be flat or rounded.

20 Claims, 9 Drawing Sheets

FIBER OPTIC FERRULE WITH IMPROVED ABILITY TO ACHIEVE FERRULE MATING PLANE CONTACT

REFERENCE TO RELATED CASE

This application claims priority under 35 U.S.C. §119 (e) to provisional application No. 62/151,948 filed on Apr. 23, 2015, the contents of which are hereby incorporated by reference in their entirety.

FIELD OF THE INVENTION

Multi-fiber fiber optic connectors typically include a fiber optic ferrule that is spring loaded within the fiber optic connector. When the fiber optic connector is in an unmated condition (not engaging another fiber optic connector), the spring presses the fiber optic ferrule against a seating surface in the fiber optic connector. After the fiber optic ferrule makes contact with a mating fiber optic ferrule, both fiber optic ferrules are pushed backward relative to their fiber optic connector and off of the seating surface. Once in the fully mated condition, the fiber optic ferrule is in contact with a spring from the rear and a mating fiber optic ferrule from the front. As a result, the fiber optic ferrules are floating within the fiber optic connector housing. The float of the fiber optic ferrules allows for deformation or movement of the connector housing without disrupting the ferrule mating planes from contacting one another.

Typically, the spring contacts the rear face of the fiber optic ferrule, biasing the fiber optic ferrule in a forward position. Usually, the spring only contacts the sides of the fiber optic ferrule providing for symmetrical force on the fiber optic ferrule. However, the springs may, depending on the forces applied to the fiber optic connector and the configuration of the spring, contact other portions of the rear face of the fiber optic ferrule. When this occurs, an off-axis moment is created, causing the faces of the fiber optic ferrules to separate from one another, reducing the effectiveness of the joining point. Thus, a new fiber optic ferrule has been created to reduce the number of off-axis moments.

SUMMARY OF THE INVENTION

The present invention is directed to a fiber optic ferrule with improved mating plane contact includes a main body having a front end, a back end, a top, a bottom, two sides, and a first opening extending from the back end toward the front end, the first opening configured to receive optical fibers therein, a plurality of optical fiber openings disposed in the main between the front end and the first opening, each of the optical fiber openings to receive an optical fiber therein, a longitudinal axis extending through the main body, a mating surface at the front end of the main body, the mating surface lying in a mating plane, the mating plane being perpendicular to the longitudinal axis, and a pair of spring pads disposed across the first opening from one another, each of the pair of spring pads having an engagement surface facing away from the main body, the engagement surfaces of the pair of spring pads lying in a single plane.

In some embodiments, the single plane and the mating plane are parallel to each other.

In some other embodiments the pair of spring pads are disposed adjacent the sides of the main body.

In other embodiments, the pair of spring pads are disposed adjacent the top and bottom of the main body.

According to another aspect of the present invention, a fiber optic connector providing improved mating plane contact includes a connector housing having a front end and a back end with a fiber optic ferrule opening extending therebetween, the fiber optic ferrule opening configured to receive a fiber optic ferrule therein from the back end, the fiber optic ferrule including a main body having a front end, a back end, a top, a bottom, two sides, and a first opening extending from the back end toward the front end, the first opening configured to receive optical fibers therein, a plurality of optical fiber openings disposed in the main between the front end and the first opening, each of the optical fiber openings to receive an optical fiber therein, a longitudinal axis extending through the main body, and a mating surface at the front end of the main body, the mating surface lying in a mating plane, the mating plane being perpendicular to the longitudinal axis, a pair of spring pads, each of the pair of spring pads having an engagement surface facing away from the fiber optic ferrule, the engagement surfaces of the spring pads lying in a single plane, a spring having a front end and a back end, the front end of the spring engaging only the engagement surfaces of the pair of spring pads, and a spring push engaging the back end of the spring and the connector housing to retain the spring and fiber optic ferrule within the connector housing.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
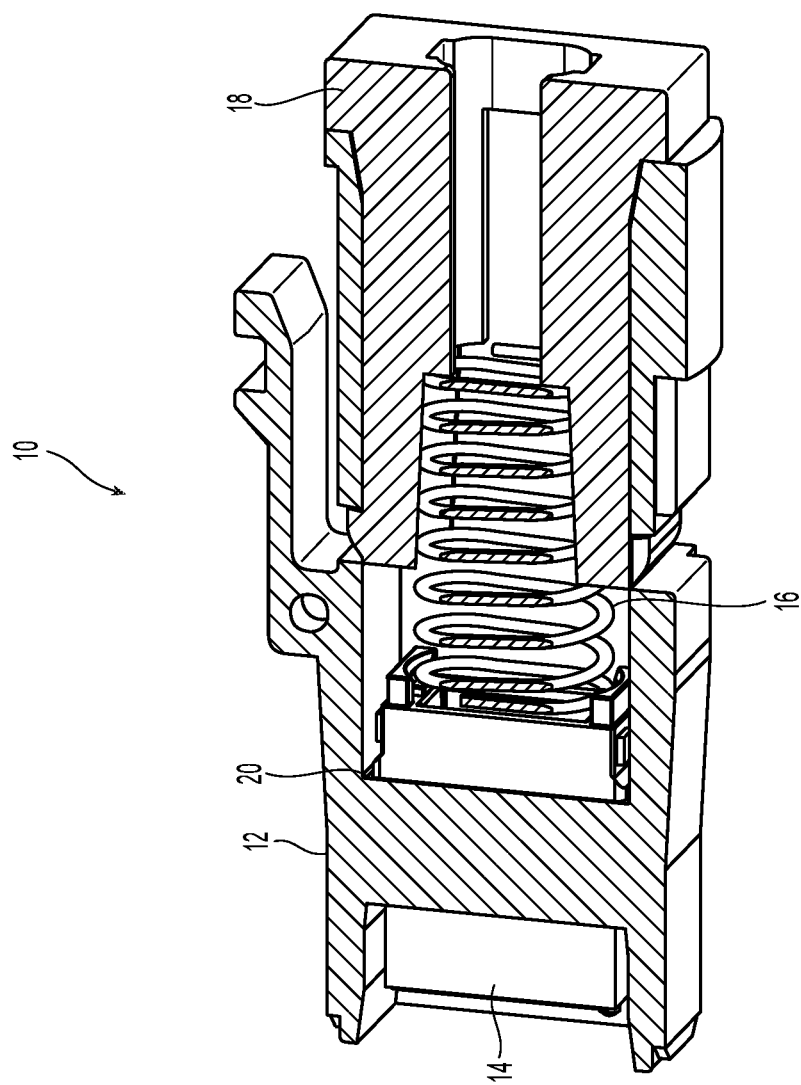
FIG. 1 is a perspective of a cross section of a prior art fiber optic connector illustrating the ferrule in an unmated configuration.

Reference will now be made in detail to the present preferred embodiment(s) of the invention, examples of which are illustrated in the accompanying drawings. Whenever possible, the same reference numerals will be used throughout the drawings to refer to the same or like parts.

Figure 2:
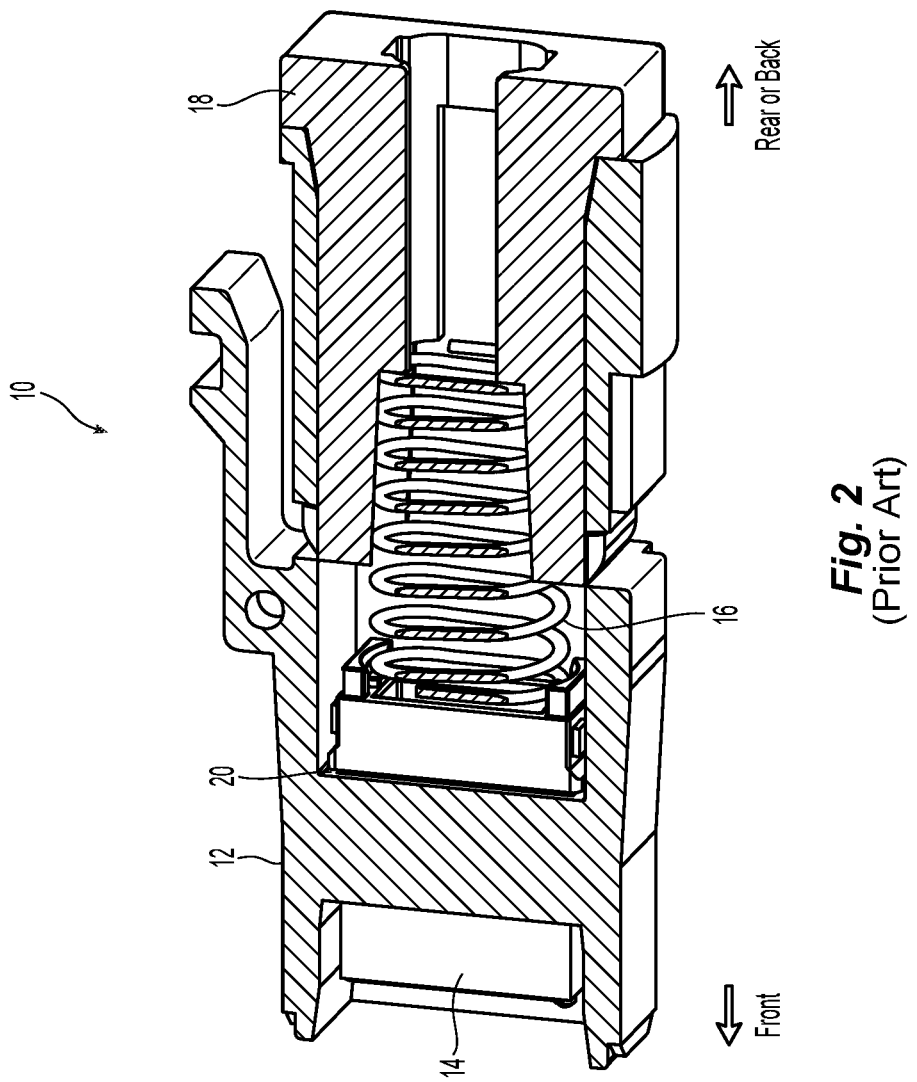
FIG. 2 is a perspective view of the prior art fiber optic connector of FIG. 1 with the ferrule in a mated configuration.
Figure 3:
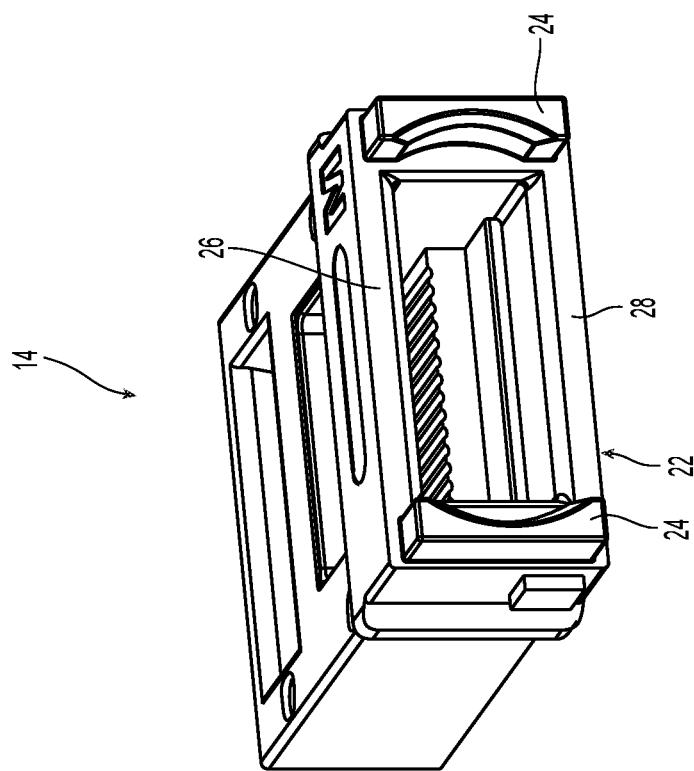
FIG. 3 is a rear perspective view of the prior art fiber optic ferrule in the fiber optic connector of FIG. 1.
Figure 4:
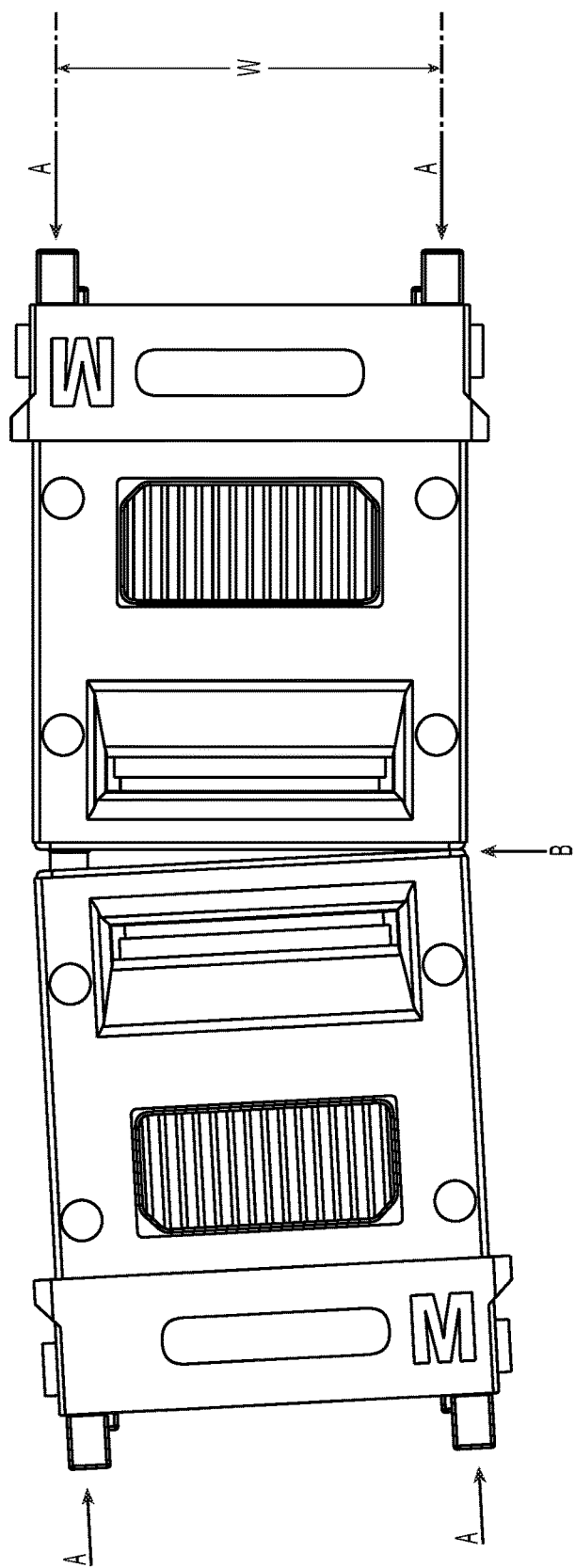
FIG. 4 is a top plane view illustrating the moment created about the side edges of two fiber optic ferrules from the spring exerting unequal force across the width of the two fiber optic ferrules.

FIGS. 1-3 illustrate a prior art fiber optic connector and prior art ferrule. In FIG. 1, the fiber optic connector 10 includes a connector housing 12, a fiber optic ferrule 14, a spring 16, and a spring push 18. As is known in the art, the fiber optic ferrule 14 is inserted into the connector housing 12 and it engages a seating surface 20, which prevents the the fiber optic ferrule 14 from traveling too far toward the front of the connector housing 12. The spring 16 is inserted behind the fiber optic ferrule 14 to bias it toward the seating surface 20. A spring push 18 engages the back end of the spring 16 and the connector housing 12, securing the fiber optic ferrule 14, a spring 16, and the spring push 18 in the connector housing 12. In FIG. 2, the fiber optic ferrule 14 is engaging another fiber optic ferrule (not shown), which is pushing on the fiber optic ferrule 14. The spring 16 is being compressed between the fiber optic ferrule 14 and the spring push 18. As long as the spring 16 squarely engages the back end 22 of the fiber optic ferrule 14, see FIG. 3, then the fiber optic ferrule 14 can appropriately engage the other fiber optic ferrule. The spring 16 is designed to engage the back end 22 of the fiber optic ferrule 14 adjacent the two spring retaining members 24. However, the spring 16 may also engage the back end 22 of the fiber optic ferrule 14 along the top 26 and the bottom 28. When the spring either contacts only the top 26 or the bottom 28, or when the spring contacts either the top 26 or bottom 28 with significantly more force, an off-axis moment is created and interferes with the mating of the fiber optic ferrules. If the spring 16 engages one side of the fiber optic ferrule 14 more than the other, then that also creates an off-axis moment—in the x-direction. For example, such a situation is illustrated in FIG. 4. The spring force is illustrated by arrows A and the location of the moment force is illustrated at point B. This causes the faces of the fiber optic ferrules to not engage one another (to be in different planes), thereby interfering with the transmission of the light across the gap between the two fiber optic ferrules. Since half of the spring force on each side is where the arrows A are, the sum of the moments about the point B is the width W between the spring force arrows multiplied by the spring force.

Figure 5:
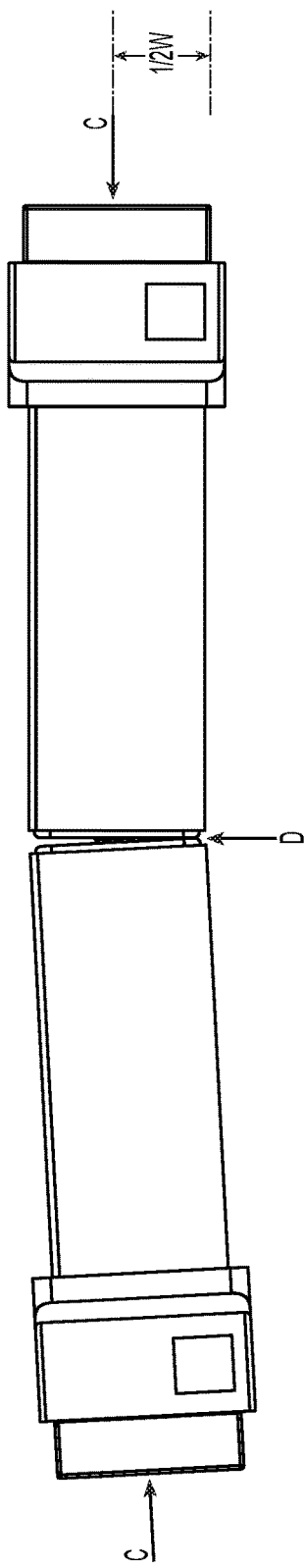
FIG. 5 is a plane view illustrating the moment created about the bottom edges of two fiber optic ferrules from the spring exerting unequal force across the height of the two fiber optic ferrules.

Similarly, if the spring force (arrows C) creates a gap in the y-direction as illustrated in FIG. 5, then the location of the sum of the moments is illustrated at the bottom edge at point D. The sum of the moments in this case is twice the spring force (assuming the spring force is the same on both sides) multiplied by the width (one-half the height of the fiber optic ferrules).

Figure 6:
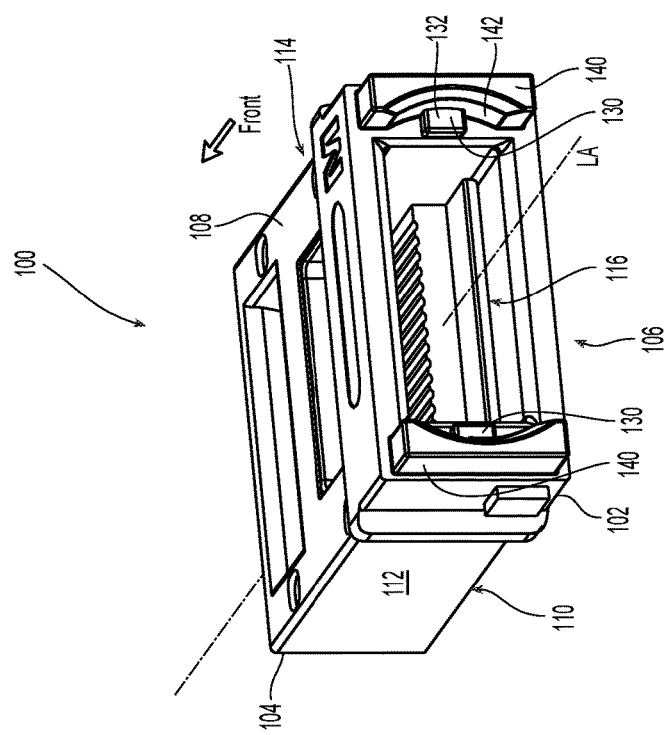
FIG. 6 is a rear perspective view of one embodiment of a fiber optic ferrule according to the present invention.

Applicant has determined that these issues can be reduced, if not eliminated, by reducing the area of contact on the fiber optic ferrule 100 by the spring 16. To this end, there is illustrated in FIG. 6 a fiber optic ferrule 100 according to one embodiment of the present invention. The fiber optic ferrule 100 has a main body 102 having a front end 104, a back end 106, a top 108, a bottom 110, two sides 112,114, and a first opening 116 extending from the back end 106 toward the front end 104. The first opening 116 is configured to receive optical fibers (not shown) which transmit the light through the fiber optic ferrule 100.

The term "front" and "forward" as used herein means that direction where the fiber optic connector would mate with another fiber optic connector or device, while the term "rear" is used to mean the direction from which the optical fibers enter into the fiber optic ferrule. So turning to FIG. 6, the front is the direction shown by the arrow and "back" or "rearward" is the opposite direction. Thus, the front of the fiber optic ferrule 100 is pointed into the page in FIG. 6 and the rear or back end 106 of the fiber optic ferrule 100 is visible and the rearward direction is coming out of the page. The top of the fiber optic ferrule is that side that has a large M and two openings (for reference, the top of the two fiber optic ferrules are illustrated in FIG. 4).

Figure 8:
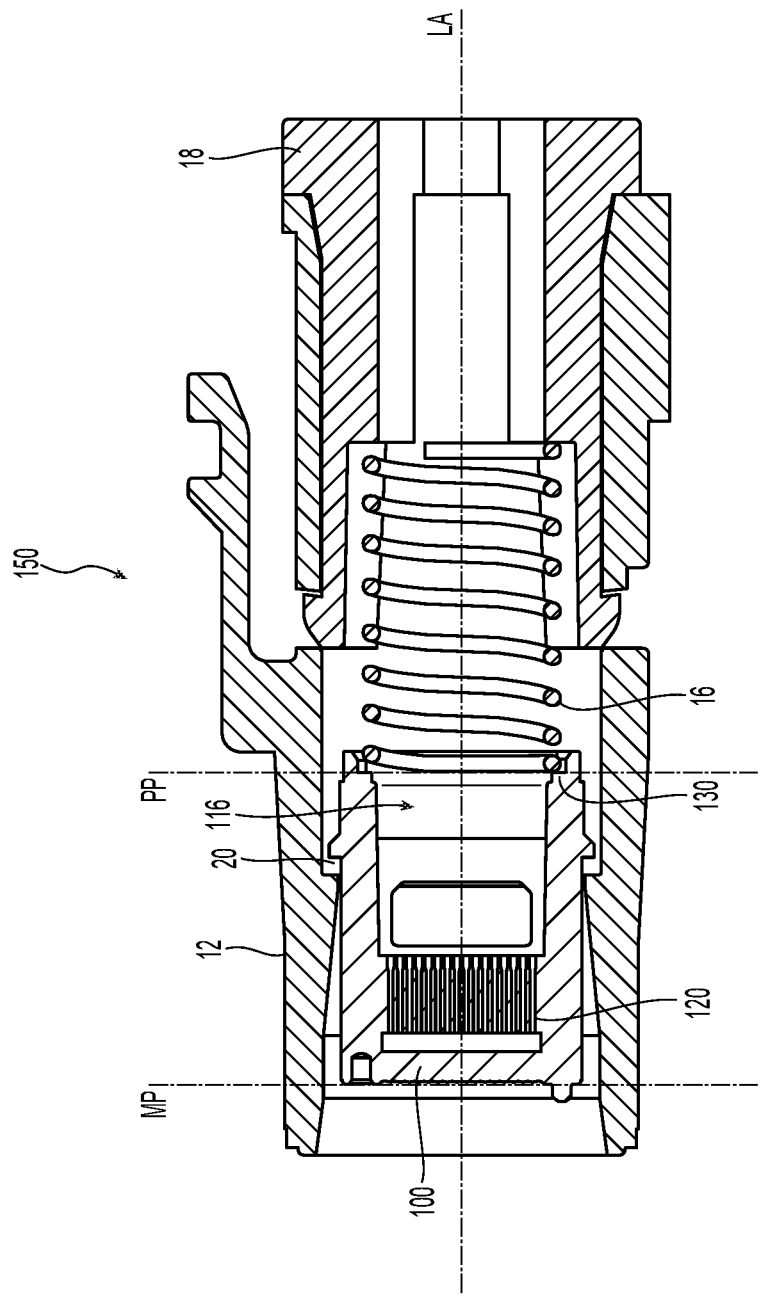
FIG. 8 is a cross sectional view of one embodiment of a fiber optic connector according to the present invention using the fiber optic ferrule in FIG. 6.

Returning to the fiber optic ferrule 100 in FIGS. 6 and 8, the fiber optic ferrule 100 also has a plurality of optical fiber openings 120 disposed in the main body 102 between the front end 104 and the first opening 116, each of the optical fiber openings 120 to receive an optical fiber therein (not shown). The fiber optic ferrule 100 has a longitudinal axis LA extending through the main body 102, which is parallel to the plurality of the optical fiber openings 120.

Figure 7:
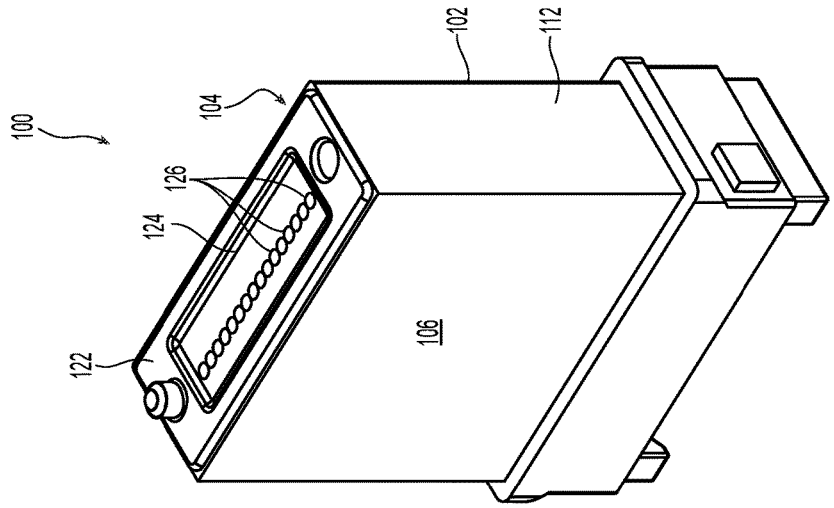
FIG. 7 is a front perspective view of the fiber optic ferrule in FIG. 6.

Turning to FIG. 7, the front end 104 has a mating surface 122 to engage other fiber optic ferrules and the mating surface 122 lies in a mating plane MP, the mating plane MP being perpendicular to the longitudinal axis LA. The front end 104 of the main body 102 has a central recessed portion 124, the recessed portion 124 having a plurality of lenses 126, each of the plurality of lenses 126 being aligned with one of the plurality of optical fiber openings 120.

Returning to FIG. 6, the fiber optic ferrule 100 has a pair of spring pads 130, one disposed on each side of the first opening 116. Each of the pair of spring pads 130 has an engagement surface 132 facing away from the main body 102 or in a rearward direction as noted above. The engagement surfaces 132 of the pair of spring pads 130 lie in a single plane PP. As will be recognized by those skilled in the art, the spring pads 130 would be best configured as (horizontal) lines rather than the squares illustrated in the figures. The smaller the area of contact of the spring pads 130 with the spring, the less the chance of creating unwanted moments at the ferrule-ferrule interface. For example, the spring pads 130 could have a cylindrical surface instead of a plane. See, e.g., FIGS. 10 and 11. Because the cylindrical surface would cause only a line of contact between the spring and a cylindrical spring pad, the stress in the stress pad would be high. As such, the spring pads 130 are illustrated as being square in shape, although they could be of any shape and still fall within the scope of the present invention. Additionally, the spring pads 130 are about 0.5 mm in height (between the top 108 and bottom 110. The spring pads 130 are also about 0.25 mm deep (measured from the back end 106 of the fiber optic ferrule 100 to the engagement surfaces 132).

Applicant notes that it is difficult to achieve complete planarity of such small structures. Applicant means that the two engagement surfaces 132 are within the same plane as allowed by manufacturing tolerances. As such, on the microscopic scale, the two engagement surfaces 132 may be little off, but the intention is that the two engagement surfaces 132 would engage the spring 16 at the same time and provide consistent pressure to the fiber optic ferrule 100.

The fiber optic ferrule 100 also has two spring retainers 140 to keep the spring 16 centered in the fiber optic ferrule 100. The spring retainers 140 are disposed on and extend from the back end 106 and away from the main body 102, extending beyond the engagement surfaces 132. Each of the spring retainers 140 is disposed between the first opening 116 and one side 112,114, of the main body 102. Preferably, the spring retainers have an inside surface 142 that is curved to engage a portion of the spring 16. Preferably, the curvature of inside surface 142 is consistent with the shape of the spring 16 to provide appropriate support/contact with the spring 16 and prevent the spring 16 from disengaging with the fiber optic ferrule 100.

While Applicant believes that it is clear, the fiber optic ferrule 100 can be used to make a fiber optic connector 150 with the connector housing 12, a fiber optic ferrule 14, a spring 16, and a spring push 18 as illustrated in FIG. 8.

Figure 9:
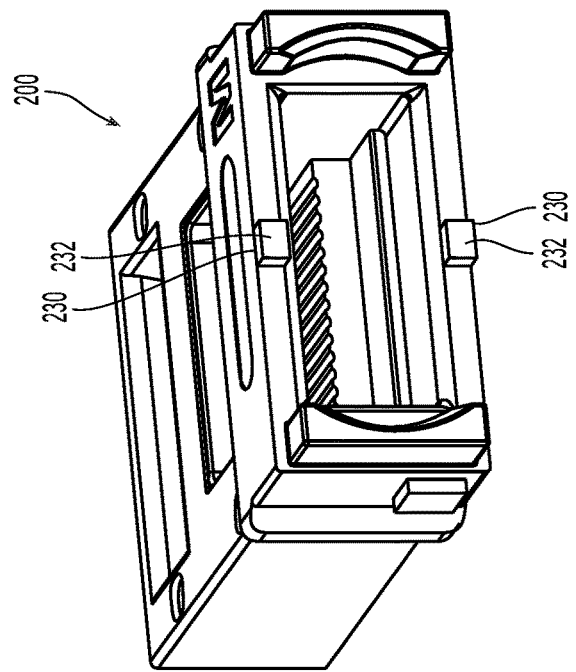
FIG. 9 is a rear perspective view of a second embodiment of a fiber optic ferrule according to the present invention.

As illustrated in FIG. 9, an alternative embodiment of a fiber optic ferrule 200 is illustrated. The fiber optic ferrule 200 is preferably the same as in the first embodiment (but may be of any multi-fiber type with appropriate structures), but the pair of spring pads 230 are above and below the first opening 216 rather than on either side. Similarly, the spring pads 230 each has an engagement surface 232.

Figure 10:
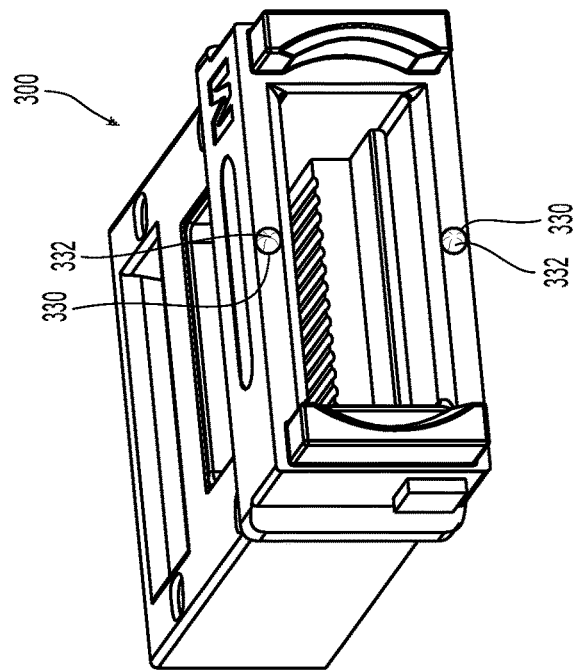
FIG. 10 is a rear perspective view of a third embodiment of a fiber optic ferrule according to the present invention.

FIG. 10 illustrates an alternative embodiment of a fiber optic ferrule 300. The fiber optic ferrule 300 has a pair of spring pads 330 that have a surface 332 that has a rounded configuration (i.e., could a portion of a sphere or oval). The shape of the spring pads 330 provides a smaller but more appropriate contact point for the spring 16. Naturally, while the spring pads 330 are illustrated as having one above and one below the opening, they could also be disposed on the sides of the first opening as with spring pads 130.

Figure 11:
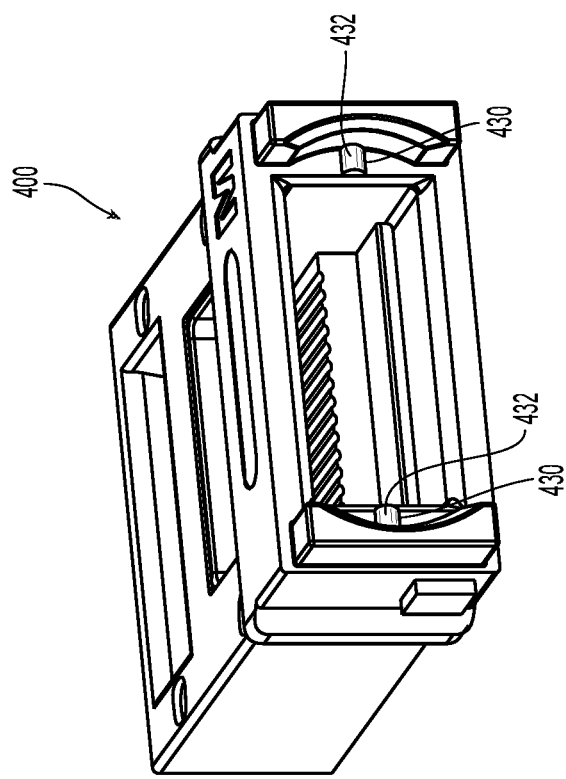
FIG. 11 is a rear perspective view of a fourth embodiment of a fiber optic ferrule according to the present invention

Illustrated in FIG. 11 is an alternative embodiment of a fiber optic ferrule 400. The fiber optic ferrule 400 has a pair of spring pads 430 that have a surface 432 that is configured as a portion of a cylinder. The shape of the spring pads 430 also provides a smaller but more appropriate contact point for the spring 16. Again, while the spring pads 430 are illustrated as being disposed on the sides of the first opening as with spring pads 130, they could also be placed with one above and one below the first opening. Applicant notes that each of the pair of spring pads could be in either of the locations shown and have any of the configurations.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A fiber optic ferrule with improved mating plane contact comprising:
    a main body having a front end, a back end, a top, a bottom, two sides, and a first opening extending from the back end toward the front end, the first opening configured to receive optical fibers therein;
    a plurality of optical fiber openings disposed in the main body between the front end and the first opening, each of the optical fiber openings to receive an optical fiber therein;
    a longitudinal axis extending through the main body;
    a mating surface at the front end of the main body, the mating surface lying in a mating plane, the mating plane being perpendicular to the longitudinal axis; and
    a pair of spring pads disposed across the first opening from one another, each of the pair of spring pads having an engagement surface facing away from the main body, the engagement surfaces of the pair of spring pads lying in a single plane.

2. The fiber optic ferrule according to claim 1, wherein the single plane and the mating plane are parallel to each other.

3. The fiber optic ferrule according to claim 1, wherein the pair of spring pads are disposed adjacent the sides of the main body.

4. The fiber optic ferrule according to claim 1, wherein the pair of spring pads are disposed adjacent the top and bottom of the main body.

5. The fiber optic ferrule according to claim 1, further comprising two spring retainers, the spring retainers disposed on and extending from the back end and away from the main body, each spring retainer disposed between the first opening and one side of the main body, the spring retainers extending farther away from the back end of the main body than the engagement surface of the spring pads and having a curved side face to engage a portion of a spring.

6. The fiber optic ferrule according to claim 1, wherein the front end of the main body has a central recessed portion, the recessed portion having a plurality of lenses, each of the plurality of lenses being aligned with one of the plurality of optical fiber openings.

7. The fiber optic ferrule according to claim 1, wherein the engagement surface of each spring pad is a flat surface.

8. The fiber optic ferrule according to claim 1, wherein the engagement surface of each spring pad is rounded.

9. The fiber optic ferrule according to claim 1, wherein the engagement surface of each spring pad has cylindrical shape.

10. A fiber optic connector providing improved mating plane contact comprising:
    a connector housing having a front end and a back end with a fiber optic ferrule opening extending therebetween, the fiber optic ferrule opening configured to receive a fiber optic ferrule therein from the back end;
    a fiber optic ferrule comprising:
        a main body having a front end, a back end, a top, a bottom, two sides, and a first opening extending from the back end toward the front end, the first opening configured to receive optical fibers therein;
        a plurality of optical fiber openings disposed in the main body between the front end and the first opening, each of the optical fiber openings to receive an optical fiber therein;
        a longitudinal axis extending through the main body; and
        a mating surface at the front end of the main body, the mating surface lying in a mating plane, the mating plane being perpendicular to the longitudinal axis; and
    a pair of spring pads, each of the pair of spring pads having an engagement surface facing away from the fiber optic ferrule, the engagement surfaces of the spring pads lying in a single plane;
    a spring having a front end and a back end, the front end of the spring engaging only the engagement surfaces of the pair of spring pads; and
    a spring push engaging the back end of the spring and the connector housing to retain the spring and fiber optic ferrule within the connector housing.

11. The fiber optic connector according to claim 10, wherein the pair of spring pads are disposed on the back end of the main body and across the first opening from one another.

12. The fiber optic connector according to claim 10, wherein the single plane and the mating plane are parallel to each other.

13. The fiber optic connector according to claim 11, wherein the pair of spring pads are disposed adjacent the sides of the main body.

14. The fiber optic connector according to claim 12, wherein the pair of spring pads are disposed adjacent the top and bottom of the main body.

15. The fiber optic ferrule according to claim 10, wherein the engagement surface of each spring pad is a flat surface.

16. The fiber optic ferrule according to claim 10, wherein the engagement surface of each spring pad is rounded.

17. The fiber optic ferrule according to claim 10, wherein the engagement surface of each spring pad has cylindrical shape.

18. A fiber optic ferrule with improved mating plane contact comprising:
    a main body having a front end, a back end, a top, a bottom, two sides, and a first opening extending from the back end toward the front end, the first opening configured to receive optical fibers therein;
    a plurality of optical fiber openings disposed in the main body between the front end and the first opening, each of the optical fiber openings to receive an optical fiber therein;
    a longitudinal axis extending through the main body;
    a mating surface at the front end of the main body, the mating surface lying in a mating plane, the mating plane being perpendicular to the longitudinal axis;
    a pair of spring pads disposed across the first opening from one another, each of the pair of spring pads having an engagement surface facing away from the main body, the engagement surfaces of the pair of spring pads lying in a single plane; and
    two spring retainers, the spring retainers disposed on and extending from the back end and away from the main body, each spring retainer disposed between the first opening and one side of the main body, the spring retainers extending farther away from the back end of the main body than the engagement surface of the spring pads and having a curved side face to engage a portion of a spring.

19. The fiber optic ferrule according to claim 18, wherein the front end of the main body has a central recessed portion, the recessed portion having a plurality of lenses, each of the plurality of lenses being aligned with one of the plurality of optical fiber openings.

20. The fiber optic ferrule according to claim 18, wherein the engagement surface is chosen from the group of surfaces consisting of flat, rounded and cylindrical.

\* \* \* \* \*